United States Patent
Wannebo

[19]
[11] Patent Number: 5,989,370
[45] Date of Patent: *Nov. 23, 1999

[54] METHOD AND ARRANGEMENT FOR ULTRASONIC WELDING

[75] Inventor: Andreas Wannebo, Lindome, Sweden

[73] Assignee: SCA Hygiene Products Aktiebolag, Gothenburg, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,824
[22] PCT Filed: Nov. 3, 1994
[86] PCT No.: PCT/SE94/01034
  § 371 Date: May 8, 1996
  § 102(e) Date: May 8, 1996
[87] PCT Pub. No.: WO95/13182
  PCT Pub. Date: May 18, 1995

[30] Foreign Application Priority Data

Nov. 9, 1993 [SE] Sweden .................................. 9303693

[51] Int. Cl.⁶ .............................. B32B 31/08; B32B 31/20
[52] U.S. Cl. ........................ 156/73.1; 156/290; 156/324; 156/580.2
[58] Field of Search .................................. 156/73.1, 73.2, 156/290, 292, 379.6, 580.2, 324

[56] References Cited

U.S. PATENT DOCUMENTS

| | | |
|---|---|---|
| 3,733,238 | 5/1973 | Long et al. . |
| 3,879,256 | 4/1975 | Rust, Jr. . |
| 4,311,540 | 1/1982 | Hill . |
| 4,404,052 | 9/1983 | Persson et al. .......................... 156/290 |
| 4,414,045 | 11/1983 | Wang et al. . |
| 4,713,132 | 12/1987 | Abel et al. . |
| 5,433,816 | 7/1995 | Stewart et al. . |

FOREIGN PATENT DOCUMENTS

| | | |
|---|---|---|
| 0 238 295 | 9/1987 | European Pat. Off. . |
| 0234658 | 9/1987 | European Pat. Off. . |
| 57-70613 | 5/1982 | Japan . |

*Primary Examiner*—Sam Chuan Yao
*Attorney, Agent, or Firm*—Burns, Doane, Swecker & Mathis, L.L.P.

[57] ABSTRACT

The present invention relates to a method and apparatus for ultrasonic welding of material webs which move between at least one ultrasonic horn of an ultrasonic welding arrangement and an anvil holder having a determined pattern of anvils, so as to enable the webs to be welded at high web speeds. The weld width of each ultrasonic horn in the ultrasonic welding arrangement is determined in accordance with the intended highest travel speed of the webs.

9 Claims, 1 Drawing Sheet

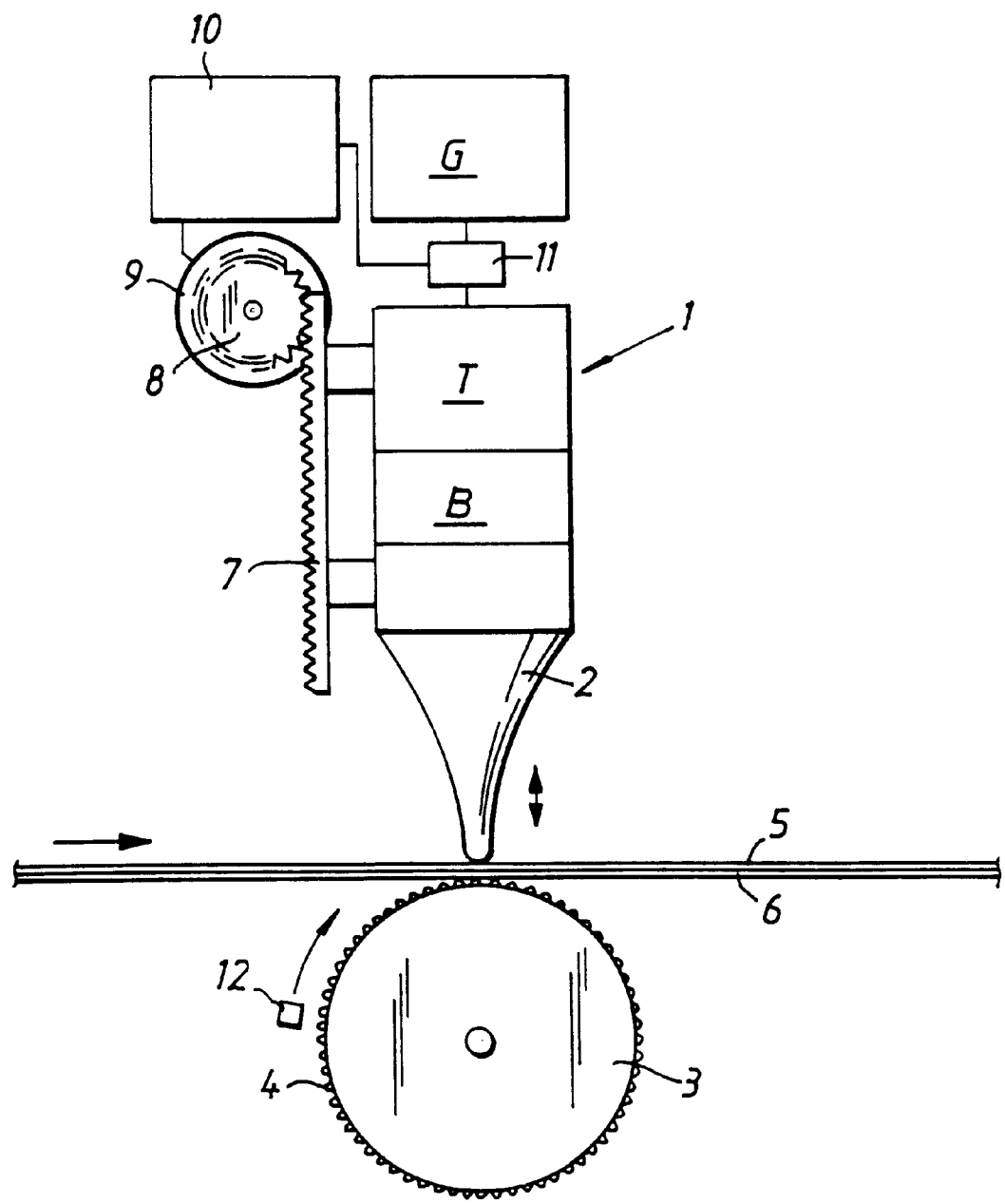

METHOD AND ARRANGEMENT FOR ULTRASONIC WELDING

TECHNICAL FIELD

The present invention relates to a method for the ultrasonic welding of material webs which move at high speeds in the nip between the ultrasonic horn of a welding unit and an anvil holder in which anvils are disposed in a given pattern.

BACKGROUND OF THE INVENTION

When ultrasonically welding, the materials to be welded together are worked mechanically by moving the end of an ultrasonic horn up and down in the material with a frequency that lies within the ultrasonic range. Heat is generated in the material as a result of the internal friction created by this mechanical working process, causing the material to melt in the worked area so that materials located in between horn and anvil will melt and therewith fuse together. Naturally, the heat generated in the materials will depend on the degree to which the material is worked, and if the material is worked to an excessively low degree the bond between the materials will be weak or non-existent, whereas if the material is worked to an excessive degree the materials will be perforated. The anvils are often comprised of projections which stand-out from the surface of an anvil holder, so as to provide a small "contact surface" between horn and anvil, and the energy delivered by the welding unit is concentrated over a small area. When welding moving webs of material, the anvils often comprise a suitable pattern of projections on a pattern cylinder or drum. One problem encountered when ultrasonic welding moving webs, for instance when bonding together the outer sheets of absorbent articles, such as diapers, sanitary napkins or incontinence guards, is that of providing a weld seam at the high rates of web travel that are desirable in such manufacture.

U.S. Pat. No. 4,414,045 teaches an arrangement for producing nonwoven fabric by ultrasonic welding of the fibers in a mat of loosely-laid weldable fibers, this mat being moved at speeds greater than 50 m/min. This arrangement includes a plurality of anvil rolls which are disposed sequentially in the movement direction of the mat and each of which has an anvil density such that the sum of the anvils per unit area on all cylinders will correspond to the desired number of bonding points per unit area of the nonwoven fabric. An arrangement of this kind is bulky and requires the anvil cylinders to be driven synchronously in order to achieve a desired bonding pattern.

SUMMARY OF THE INVENTION

The object of the present invention is to solve the problem of obtaining weld bonds in a simple and attractive manner when ultrasonically welding webs of material that move at high speeds.

This object is achieved by means of a method of the kind defined in the introduction which is characterized by determining the weld width of each ultrasonic horn in the ultrasonic welding unit in accordance with the intended highest travelling speed of the webs. When the welding width of the ultrasonic horns is reduced for webs that travel at high speeds, the counterpressure exerted by the anvil cylinder and the webs is also reduced, so that the amplitude of horn movement can be maintained and a good weld bond ensured.

According to one preferred embodiment of the method, the welding width of each ultrasonic horn is made so small that welding is effected with an average power intake of the ultrasonic welding unit concerned. In this way, the major part of the energy delivered to the welding unit is used for useful work. When ultrasonic welding webs that are comprised of nonwoven fabric which includes polypropylene with a combined or total thickness of 0.4–1.4 mm, the welding width of each ultrasonic horn in the ultrasonic welding arrangement will be smaller than 70 mm for web speeds in excess of 60 m/min. In the case of maximum web speeds, in excess of 100 and 160 m/min, the welding width of each ultrasonic horn in the ultrasonic welding arrangement will be smaller than 50 and 30 mm respectively.

The invention also relates to an ultrasonic welding arrangement for mutually bonding webs of material which run in the nip between an ultrasonic horn of an ultrasonic unit and an anvil holder at speeds greater than 60 m/min, said arrangement comprising a plurality of ultrasonic units which are placed sequentially transversely to the direction of web travel, said arrangement being characterized in that the width of each ultrasonic horn is smaller than 70 mm.

When welding at web travel speeds in excess of 100 m/min, the width of each ultrasonic horn is smaller than 50 mm, whereas at web travel speeds in excess of 160 m/min, the width of each horn is smaller than 30 mm.

BRIEF DESCRIPTION OF THE DRAWING

An exemplifying embodiment of the invention will now be described with reference to the accompanying drawing, which is a schematic side view of an ultrasonic welding arrangement suitable for carrying out the inventive method.

BRIEF DESCRIPTION OF THE PREFERRED EMBODIMENT

The ultrasonic welding arrangement illustrated in the drawing includes an ultrasonic welding unit 1 which is comprised conventionally of an electric high-frequency generator G, a transducer T which converts the high-frequency electrical energy to mechanical energy, an amplifier B which increases the amplitude of the mechanical oscillations, and an ultrasonic horn 2 which is connected to the amplifier B such that its mechanical oscillations are transmitted to the horn in the form of reciprocating motion in the longitudinal direction of the unit 1, as indicated by the double arrow in the drawing.

The components used in the unit may be of any appropriate kind. For instance, the generator G and the transducer T may be of the kind sold by Dukane Corp., Illinois, U.S.A., under the designations 20A2000 and 41C30 respectively.

The arrangement also includes an anvil cylinder 3 on whose peripheral surface anvils 4 in the form of projections are disposed in a chosen pattern. Although not shown, the arrangement includes transport means of any known kind which function to move the webs 5, 6, to be joined together through the nip or gap defined by the periphery of the anvil cylinder 3 and the end of the ultrasonic horn 2. In operation, the anvil cylinder is rotated at a speed at which its peripheral speed will coincide with the speed at which the webs 5, 6 travel. The direction of web travel and the direction of cylinder rotation are indicated in the drawing with arrows.

In order to enable the distance between horn 2 and anvil 4 to be adjusted, the horn is suspended for sliding movement in a direction at right angles to the web travel direction, i.e. in the longitudinal direction of the welding unit, and means are provided for moving said horn, said means being schematically illustrated in the drawing in the form of a vertically movable rack 7 which is fixedly mounted on the unit 1, and a fixed cog wheel 8 which is rotated by an AC-motor 9, preferably a stepping motor. As will be understood, the horn moving means may alternatively comprise a screw nut arrangement or any other type of device which will produce linear movement and which can be controlled with the necessary precision.

The arrangement also includes a control unit 10, preferably a minicomputer, which controls the AC-motor 9 and a device 11 which delivers to the control unit a signal indicating the instantaneous power intake of the welding unit. This device may, for instance, comprise an energy module sold by Dukane Corp., Illinois, U.S.A., and designated 438-639, although other types of power indicators may be used, of course. The control unit 10 and the generator G are connected to an electric power source (not shown), for instance to the mains network. A speedometer 12, of any suitable kind, measures the rotational speed of the anvil cylinder 3 and sends a signal indicating this speed to the computer 10, which calculates the web travel speed on the basis of this signal.

An arrangement of the aforedescribed kind is described in Applicant's Swedish Patent Application No. 9302106-1 filed on the Jun. 17, 1993. Reference is made to this Application for a more detailed description of how such an arrangement operates and functions.

When welding together several thin webs comprised of nonwoven fabric which included polypropylene and had a combined thickness of 0.4–1.4 mm in tests carried out on such an arrangement, which was driven with a frequency of about 20 kHz, a maximum power intake of 600 W and a horn welding width of 70 mm, it was found impossible to weld together webs which travelled at speeds greater than 60 m/min. When testing the tensile strength of the weld bonds obtained when welding at different web speeds, it was found that the tensile strength of the bonds decreased with increasing web travel speeds, whereas the power intake measured by the device 11 increased with increasing web speeds. It has surprisingly been found possible to produce strong welding bonds even at high web speeds when the welding width of the ultrasonic horn is decreased. For instance, good quality bonds-have been obtained with webs moving at speeds of up to 100 m/min with a horn welding width of 50 mm, and for web speeds of up to 160 min with a horn welding width of 30 mm. It is not known exactly why this is so, although it is believed that the difficulties experienced in welding together webs when the horn or horns has/have a conventional width is because of the excessive losses that occur when energy is transferred from the horn to fast moving webs, or in other words that with a given web speed and a given horn width an increase in the power of the unit merely results in an increase in the losses and not in any increase in useful work.

One possible explanation may be that the counterpressure exerted by the webs running on the anvil cylinder is so great that the ultrasonic unit is unable to give a set amplitude to movement of the horn and that sufficient energy to melt the material at the points between anvil and the end of the horn cannot therefore be transmitted from horn to material webs with the fewer up-and-down movements that the horn is able to execute at high web speeds in comparison with low web speeds.

As before mentioned, it has been found possible to deliver sufficient useful work to the webs to produce weld bonds even at web speeds greater than 60 m/min, by reducing the width of the ultrasonic horns present in the welding line. It has also been found that weld bonds of uniform and good quality are obtained when the horn width is so small that the up-and-down movements of the horn are effected with average power intake. It is thought that this is because it is ensured that the horn will move at the intended amplitude during practically the entire welding process, whereas with a power intake which is close to the maximum power intake the counterpressure is so great that the unit is unable to press down the horn to the intended amplitude during a major part of the welding operation.

By average power intake is meant a power intake which lies significantly beneath maximum power intake and measured by the device 11. In the aforedescribed example, for instance, it was found that a high-quality weld bond was obtained with power intakes within the range of 250–500 W, these values lying significantly beneath the maximum power intake of 600 W.

According to the invention, when bonding together high-speed webs, firstly a suitable width of the ultrasonic horn is determined by test-welding the webs while the webs move at the speed intended, and then with horns of different widths. After determining a suitable horn width, the requisite number of horns for obtaining the total weld width, normally across the full width of the anvil cylinder, are disposed sequentially across the webs transversely in relation to the direction of web movement, either in line with one another or in overlapping relationship at the ends. When the ultrasonic welding arrangement includes several units having ultrasonic horns whose widths are determined in accordance with the above, the units are suitably controlled by one and the same control unit and supplied from one and the same power source.

When the described ultrasonic welding method is used with materials other than those aforementioned and at other web speeds and other ultrasonic welding units, the ultrasonic horns will naturally be given other suitable width values that have been determined by test-welding. Similarly, other anvil patterns on the anvil cylinder can result in welds of other widths.

I claim:

1. A method for ultrasonic welding of material webs which move in a feeding direction between ultrasonic horns of an ultrasonic welding arrangement and an anvil holder on which anvils are disposed in a given pattern, so as to enable high-speed webs to be welded, said method comprising:

determining a welding width of an ultrasonic horn, said determining step including:

(a) performing a first test welding of the webs while the webs move at a desired speed, said horn having a first width in a direction transverse to the feeding direction; and (b) performing further test-welding of the webs while the webs move at the desired speed with ultrasonic horns having different widths until a strong welding bond is obtained;

after determining the welding width of said ultrasonic horn, disposing a requisite number of said ultrasonic horns for obtaining a total weld width of the welding arrangement sequentially across the webs transversely in relation to the direction of web movement; and welding the material webs across the total weld width.

2. A method according to claim 1, further comprising making the weld width of each ultrasonic horn so small that welding is effected with a power intake that is significantly less than maximum power intake of an ultrasonic welding unit included in the ultrasonic welding arrangement.

3. A method according to claim 1, wherein said determining step includes determining a suitable width of the individual ultrasonic horns for each type of material webs to be joined together by test-welding at a maximum travelling speed of the webs.

4. A method according to claim 1, further comprising ultrasonically welding webs of non-woven fabric which includes polypropylene to a combined thickness of 0.4–1.4 mm, and making the weld width of each ultrasonic horn smaller than 70 mm for intended maximum web speeds greater than 60 m/min.

5. A method according to claim 4, further comprising making the weld width of each ultrasonic horn smaller than 50 mm for intended maximum web speeds greater than 100 m/min.

6. A method according to claim 5, further comprising making the weld width of each ultrasonic horn smaller than 30 mm for intended maximum web speeds greater than 160 m/min.

7. A method according to claim 1, further comprising, after determining the weld width of each ultrasonic horn in the ultrasonic welding unit in accordance with the intended highest speed of the material webs, placing the requisite number of ultrasonic horns of said determined weld width sequentially across the webs in a transverse direction relative to the direction of web movement so as to obtain a total weld width which coincides with the width of said anvil pattern.

8. A method according to claim 7, wherein the ultrasonic horns are placed in line with one another such that the welding widths of the horns are in an end to end relation and thereby form the total weld width.

9. A method according to claim 1, wherein the different width is less than the first width of said at least one horn.

* * * * *